(12) United States Patent
Binek et al.

(10) Patent No.: US 12,729,007 B2
(45) Date of Patent: Sep. 8, 2026

(54) VEHICLE COMPONENT WITH INTEGRATED ENGINE SUPPORT STRUCTURE AND BODY SECTION

(71) Applicant: Raytheon Technologies Corporation, Farmington, CT (US)

(72) Inventors: Lawrence A. Binek, Glastonbury, CT (US); Sean R. Jackson, Palm City, FL (US); Jose R. Paulino, Jupiter, FL (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 17/902,282

(22) Filed: Sep. 2, 2022

(65) Prior Publication Data

US 2024/0076049 A1 Mar. 7, 2024

(51) Int. Cl.

| | |
|---|---|
| ***B64D 27/40*** | (2024.01) |
| ***B64D 37/02*** | (2006.01) |
| ***F01D 25/28*** | (2006.01) |
| ***F02C 7/20*** | (2006.01) |
| *B33Y 80/00* | (2015.01) |

(52) U.S. Cl.

CPC ............. *B64D 27/40* (2024.01); *B64D 37/02* (2013.01); *F01D 25/28* (2013.01); *F02C 7/20* (2013.01); *B33Y 80/00* (2014.12); *F05D 2230/53* (2013.01)

(58) Field of Classification Search

CPC ...................................................... B64U 50/12

See application file for complete search history.

(56) References Cited

U.S. PATENT DOCUMENTS

| | | | | |
|---|---|---|---|---|
| 2,940,692 A * | 6/1960 | Ward | ........................ | F02C 7/20 60/262 |
| 3,809,340 A * | 5/1974 | Dolgy | .................... | B64D 27/20 244/54 |
| 4,903,476 A * | 2/1990 | Steber | ..................... | F02C 7/266 60/800 |
| 5,150,569 A * | 9/1992 | Chapman | .................. | F02K 3/00 244/135 R |
| 9,086,033 B2 | 7/2015 | Dushku | | |

(Continued)

FOREIGN PATENT DOCUMENTS

| | | |
|---|---|---|
| CN | 111140399 A | 5/2020 |
| CN | 213627697 U | 7/2021 |

OTHER PUBLICATIONS

Flight International, Nov. 8, 2020 (from wayback machine), Northrop Grumman RQ-4A Global Hawk, Flight International, p. 1 of 1. (Year: 2020).*

(Continued)

*Primary Examiner* — Devon C Kramer
*Assistant Examiner* — Marc Amar
(74) *Attorney, Agent, or Firm* — Getz Balich LLC

(57) ABSTRACT

An assembly is provided for an aerial vehicle. This assembly includes a vehicle body, a gas turbine engine and a support structure. The vehicle body includes a body section. The gas turbine engine includes a stationary structure. The gas turbine engine is housed within the vehicle body. The support structure extends between and is connected to the body section and the stationary structure. The support structure supports the gas turbine engine within the vehicle body. The body section, the stationary structure and the support structure are included in a monolithic body.

17 Claims, 8 Drawing Sheets

(56) References Cited

U.S. PATENT DOCUMENTS

| | | | | |
|---|---|---|---|---|
| 9,863,368 | B1 * | 1/2018 | Ress | F02C 7/18 |
| 11,199,136 | B2 | 12/2021 | Butcher | |
| 11,634,232 | B1 * | 4/2023 | Wiegman | B64D 31/18 244/53 R |
| 2009/0212155 | A1 * | 8/2009 | Huggins | B64D 27/402 244/54 |
| 2010/0155525 | A1 * | 6/2010 | Stuart | B64D 27/26 244/54 |
| 2011/0239656 | A1 * | 10/2011 | Crume | F02C 7/1435 60/39.53 |
| 2016/0229530 | A1 * | 8/2016 | Welsh | B64U 30/24 |
| 2018/0273194 | A1 * | 9/2018 | Edgar | B64C 39/024 |
| 2018/0362171 | A1 * | 12/2018 | Curchod | B64C 1/16 |
| 2019/0127074 | A1 * | 5/2019 | Colmagro | B64F 5/10 |
| 2020/0072125 | A1 * | 3/2020 | McKenney | F02C 7/06 |
| 2020/0109663 | A1 * | 4/2020 | Binek | F02K 3/10 |
| 2020/0164992 | A1 * | 5/2020 | Tamada | B60L 50/10 |
| 2020/0191053 | A1 * | 6/2020 | Butcher | F02C 7/20 |
| 2020/0386160 | A1 | 12/2020 | Binek | |
| 2021/0003480 | A1 * | 1/2021 | Binek | F16K 37/0075 |
| 2021/0088215 | A1 | 3/2021 | Binek | |
| 2021/0262399 | A1 * | 8/2021 | Thorup | G05D 1/0077 |
| 2021/0348526 | A1 * | 11/2021 | Binek | F01D 25/24 |
| 2023/0160323 | A1 | 5/2023 | Binek | |

OTHER PUBLICATIONS

EP Search Report for EP Patent Application No. 23195230.0 dated Feb. 1, 2024.

* cited by examiner 28
116
112
111
114
110
108
24

28
118A,120
118A,120
90
66
116
108
118B,128
84
111
118A,120
118A,120
70
118A,120
26
114
82
88
118A,120

32
132
116
90
111
118B
66
118A
108
52
84
88
130
82
118A
86
28
114
26
70

116
32
90
111
118B
118A
52
108

84
88
130
82
118A
86
114
28
26
70

VEHICLE COMPONENT WITH INTEGRATED ENGINE SUPPORT STRUCTURE AND BODY SECTION

BACKGROUND OF THE DISCLOSURE

1. Technical Field

This disclosure relates generally to an aerial vehicle and, more particularly, to integrated components for the aerial vehicle.

2. Background Information

An aerial vehicle may include a gas turbine engine housed within a vehicle body. Various types and configurations of gas turbine engines and vehicle bodies are known in the art. While these known gas turbine engines and vehicle bodies have various benefits, there is still room in the art for improvement.

SUMMARY OF THE DISCLOSURE

According to an aspect of the present disclosure, an assembly is provided for an aerial vehicle. This assembly includes a vehicle body, a gas turbine engine and a support structure. The vehicle body includes a body section. The gas turbine engine includes a stationary structure. The gas turbine engine is housed within the vehicle body. The support structure extends between and is connected to the body section and the stationary structure. The support structure supports the gas turbine engine within the vehicle body. The body section, the stationary structure and the support structure are included in a monolithic body.

According to another aspect of the present disclosure, another assembly is provided for an aerial vehicle. This assembly includes a vehicle body, a gas turbine engine and a plurality of support members. The gas turbine engine includes a stationary structure. The gas turbine engine is housed within the vehicle body. The support members extend between and are connected to the vehicle body and the stationary structure. The support members locate and support the gas turbine engine within the vehicle body. At least the stationary structure and the support members are formed together in a monolithic body.

According to still another aspect of the present disclosure, another assembly is provided for an aerial vehicle. This assembly includes a vehicle body, a gas turbine engine and a support structure. The gas turbine engine includes a stationary structure and a rotating structure at least partially housed within the stationary structure. The gas turbine engine is housed within the vehicle body. The support structure extends between and is connected to the vehicle body and the stationary structure. The support structure supports the gas turbine engine within the vehicle body. The support structure includes an integral fluid reservoir between the gas turbine engine and the vehicle body.

The vehicle body may include a tubular body section. At least the tubular body section, the stationary structure and the support members may be formed together in the monolithic body.

The support members may include a first support member. The first support member may be configured as or otherwise include a fluid reservoir.

The body section may be spaced radially out from, may extend circumferentially about and/or may extend axially along the gas turbine engine.

The body section may partially form an outer aerodynamic surface of the aerial vehicle.

The vehicle body may include a fuselage and/or a nacelle.

The stationary structure may at least partially house a rotating structure within the gas turbine engine.

The rotating structure may be configured as or otherwise include a turbine rotor. The stationary structure may house the turbine rotor.

The stationary structure may include a combustor within the gas turbine engine.

The stationary structure may include a vane array within the gas turbine engine.

The stationary structure may include a diffuser case. The stationary structure may also or alternatively include a turbine case. The stationary structure may still also or alternatively include an exhaust case.

The support structure may include a plurality of support members radially between the body section and the stationary structure.

The support members may be distributed circumferentially about the gas turbine engine.

The support members may be distributed axially along the gas turbine engine.

A first of the support members may be configured as or otherwise include a strut.

A first of the support members may be configured as or otherwise include a fuel reservoir for the gas turbine engine.

The support structure may form a fluid reservoir for the gas turbine engine radially between the gas turbine engine and the body section.

The stationary structure may include a downstream stationary structure and an upstream stationary structure mechanically attached to the downstream stationary structure. The upstream stationary structure may form an inlet section of the gas turbine engine.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
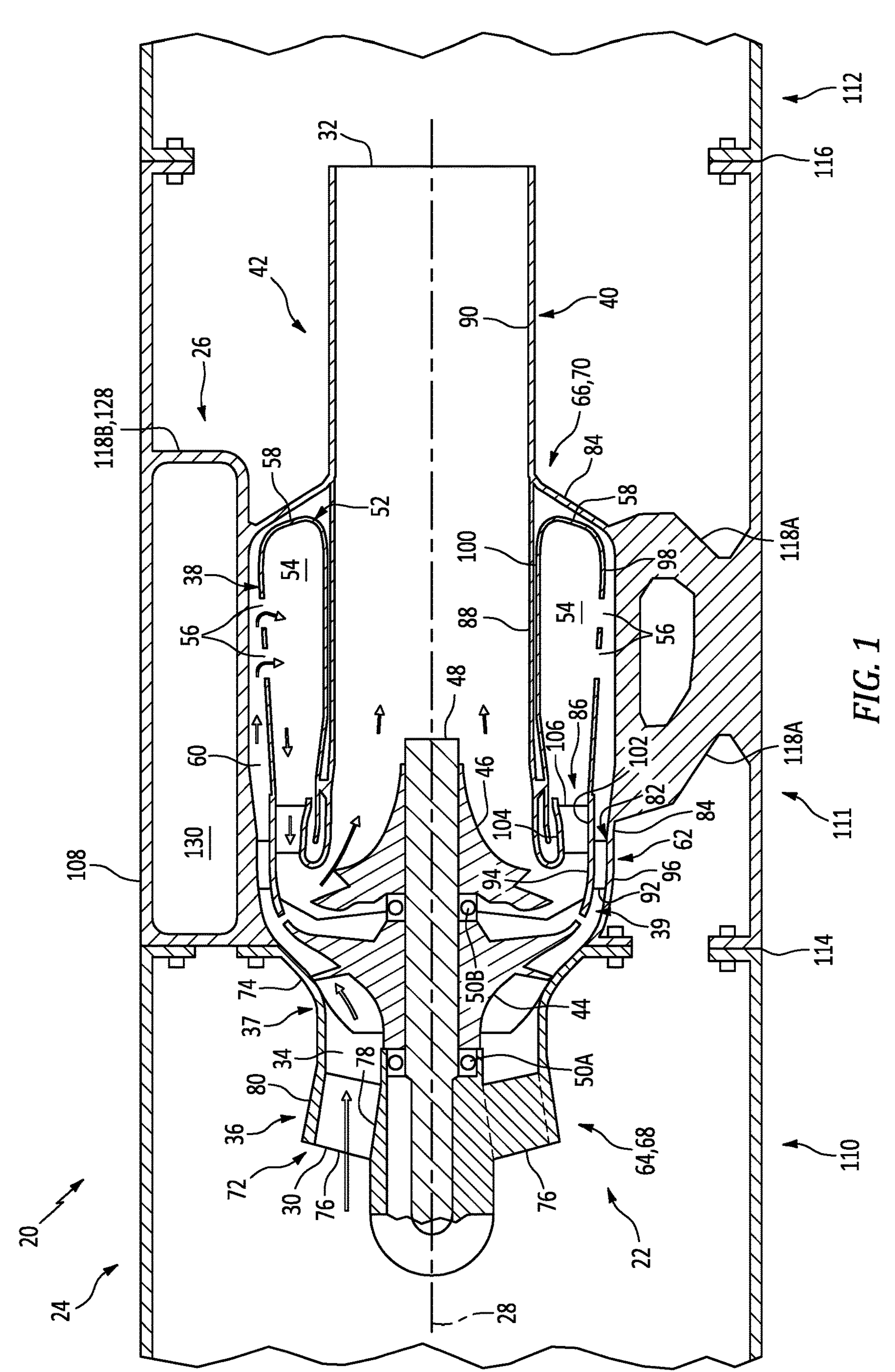
FIG. 1 is a partial side sectional illustration of an assembly for an aerial vehicle.

FIG. 1 illustrates an assembly 20 for an aerial vehicle such as, but not limited to, an unmanned aerial vehicle (UAV), a drone or any other manned or unmanned aircraft or self-propelled projectile. The vehicle assembly 20 of FIG. 1 includes a gas turbine engine 22, a vehicle body 24 and an engine support structure 26 coupling the gas turbine engine 22 to the vehicle body 24.

The gas turbine engine 22 of FIG. 1 is configured as a single spool, radial-flow turbojet gas turbine engine. This gas turbine engine 22 is configured for propelling the aerial vehicle. The present disclosure, however, is not limited to such an exemplary turbojet gas turbine engine configuration nor to a vehicle propulsion system application. For example, the gas turbine engine 22 may alternatively be configured as an auxiliary power unit (APU) for the aerial vehicle.

The gas turbine engine 22 of FIG. 1 extends axially along an axial centerline 28 between a forward, upstream airflow inlet 30 into the gas turbine engine 22 and an aft, downstream exhaust 32 out of the gas turbine engine 22. This axial centerline 28 may be a centerline axis of the gas turbine engine 22, the vehicle body 24 and/or the support structure 26. The axial centerline 28 may also or alternatively be a rotational axis for one or more components within the gas turbine engine 22.

The gas turbine engine 22 includes a core flowpath 34, an inlet section 36, a (e.g., radial flow) compressor section 37, a (e.g., reverse flow) combustor section 38, a (e.g., radial flow) turbine section 39 and an exhaust section 40. The gas turbine engine 22 also includes a static engine structure 42 housing and/or forming one or more or all of the engine section 36-40.

The core flowpath 34 extends within the gas turbine engine 22 between the engine inlet 30 and the engine exhaust 32. More particularly, the core flowpath 34 extends sequentially through the inlet section 36, the compressor section 37, the combustor section 38, the turbine section 39 and the exhaust section 40 from the engine inlet 30 to the engine exhaust 32.

The compressor section 37 includes a bladed compressor rotor 44. The turbine section 39 includes a bladed turbine rotor 46. Each of these engine rotors 44, 46 includes a plurality of rotor blades arranged circumferentially around and connected to at least one respective rotor disk and/or hub. The rotor blades, for example, may be formed integral with or mechanically fastened, welded, brazed, adhered and/or otherwise attached to the respective rotor disk(s) and/or hub(s).

The compressor rotor 44 may be configured as a radial flow compressor rotor. The turbine rotor 46 may be configured as a radial flow turbine rotor. The compressor rotor 44 is connected to the turbine rotor 46 through an engine shaft 48. This engine shaft 48 is rotatably supported by the static engine structure 42 through a plurality of bearings 50A and 50B (generally referred to as 50); e.g., rolling element bearings, journal bearings, etc.

The combustor section 38 includes an annular combustor 52 with an annular combustion chamber 54. The combustor 52 of FIG. 1 is configured as a reverse flow combustor. Inlets ports 56/flow tubes into the combustion chamber 54, for example, may be arranged at (e.g., on, adjacent or proximate) and/or towards an aft bulkhead wall 58 of the combustor 52. An outlet from the combustor 52 may be arranged axially aft of an inlet to the turbine section 39. The combustor 52 may also be arranged radially outboard of and/or axially overlap at least a (e.g., aft) portion of the turbine section 39. With this arrangement, the core flowpath 34 of FIG. 1 reverses direction (e.g., from a forward-to-aft direction to an aft-to-forward direction) a first time as the core flowpath 34 extends from a diffuser plenum 60 surrounding the combustor 52 into the combustion chamber 54. The core flowpath 34 of FIG. 1 then reverses direction (e.g., from the aft-to-forward direction to the forward-to-aft direction) a second time as the core flowpath 34 extends from the combustion chamber 54 into the turbine section 39.

During operation, air enters the gas turbine engine 22 through the inlet section 36 and its engine inlet 30. The inlet section 36 directs this air from the engine inlet 30 into the core flowpath 34 and the compressor section 37. The air within the core flowpath 34 may be referred to as core air. This core air is compressed by the compressor rotor 44 and directed through a diffuser 62 and its plenum 60 into the combustion chamber 54. Fuel is injected and mixed with the compressed core air to provide a fuel-air mixture. This fuel-air mixture is ignited within the combustion chamber 54, and combustion products thereof flow through the turbine section 39 and cause the turbine rotor 46 to rotate. The rotation of the turbine rotor 46 drives rotation of the compressor rotor 44 and, thus, compression of the air received from the engine inlet 30. The exhaust section 40 receives the combustion products from the turbine section 39. The exhaust section 40 directs the received combustion products out of the gas turbine engine 22 to provide forward engine thrust.

The static engine structure 42 of FIG. 1 includes one or more stationary structures 64 and 66. These stationary structures 64 and 66 are configured as discrete sub-structures (e.g., axial sections) of the static engine structure 42. The forward, upstream stationary structure 64 and/or the aft, downstream stationary structure 66 may each be formed as (or part of) a monolithic body 68, 70 (e.g., a monolithic vehicle component), respectively. Herein, the term "monolithic" may describe a component of the vehicle which is formed as a single unitary body. Each stationary structure 64, 66, for example, may be additively manufactured, cast, machined and/or otherwise formed as an integral, unitary body. By contrast, a non-monolithic body may include parts that are discretely formed from one another, where those parts are subsequently mechanically fastened and/or otherwise attached to one another.

The upstream stationary structure 64 may form a section of the static engine structure 42 along any one or more or all of the engine sections 36 and 37. The upstream stationary structure 64 of FIG. 1, for example, includes an inlet nozzle 72 and at least a forward, upstream section (or an entirety) of a compressor case 74. The upstream stationary structure 64 may also include an internal support structure for at least one of the bearings 50; e.g., the forward bearing 50A.

The inlet nozzle 72 is disposed within the inlet section 36, for example, at the engine inlet 30. This inlet nozzle 72 may be configured to condition the core air entering the compressor section 37. The inlet nozzle 72 of FIG. 1, for example, includes one or more inlet guide vanes 76 configured to impart swirl to the core air. These inlet guide vanes 76 are arranged circumferentially about the axial centerline 28 in an annular array; e.g., an inlet nozzle vane array. Each of the inlet guide vanes 76 extends radially across the core flowpath 34 between and is connected to an inner platform 78 of the inlet nozzle 72 and an outer platform 80 of the inlet nozzle 72.

The compressor case 74 houses the compressor section 37 and its compressor rotor 44. The compressor case 74, for example, extends circumferentially about (e.g., circumscribes) and axially overlaps the compressor rotor 44. The compressor case 74 may thereby form an outer peripheral boundary of the core flowpath 34 within the compressor section 37.

The downstream stationary structure 66 may form a section of the static engine structure 42 along any one or more or all of the engine sections 38-40. The downstream stationary structure 66 of FIG. 1, for example, includes a diffuser nozzle 82, an outer diffuser (e.g., plenum) case 84, the combustor 52, a turbine nozzle 86, a turbine case 88 and an exhaust case 90. The downstream stationary structure 66 may also include an internal support structure for at least one of the bearings 50; e.g., the aft bearing 50B.

The diffuser nozzle 82 is disposed within the diffuser 62 upstream of the plenum 60. This diffuser nozzle 82 may be configured to condition the core air leaving the compressor section 37 and entering the plenum 60. The diffuser nozzle 82 of FIG. 1, for example, includes one or more diffuser guide vanes 92 configured to impart swirl to the core air. These diffuser guide vanes 92 are arranged circumferentially about the axial centerline 28 in an annular array; e.g., a diffuser nozzle vane array. Each of the diffuser guide vanes 92 extends radially across the core flowpath 34 between and is connected to an inner platform 94 of the diffuser nozzle 82 and an outer platform 96 of the diffuser nozzle 82.

The diffuser case 84 houses the combustor 52 within the combustor section 38. The diffuser case 84, for example, extends circumferentially about (e.g., circumscribes), axially overlaps and is spaced radially outward from the combustor 52. The diffuser case 84 may thereby form an outer peripheral boundary of the core flowpath 34 and the plenum 60 along the combustor 52. The outer platform 96 of the diffuser nozzle 82 may be formed as a forward, upstream extension of the diffuser case 84.

The combustor 52 of FIG. 1 includes an outer combustor wall 98, an inner combustor wall 100 and the bulkhead wall 58. The outer combustor wall 98 extends axially between and may be connected to an outer platform 102 of the turbine nozzle 86 and the bulkhead wall 58. The outer combustor wall 98 extends circumferentially about (e.g., circumscribes), axially overlaps and is spaced radially outward from the inner combustor wall 100. The inner combustor wall 100 extends axially between an inner platform 104 of the turbine nozzle 86 and the bulkhead wall 58, and the inner combustor wall 100 may be connected to the bulkhead wall 58. The inner combustor wall 100 extends circumferentially about (e.g., circumscribes), axially overlaps and is spaced radially outward from the turbine case 88. The bulkhead wall 58 extends radially between the outer combustor wall 98 and the inner combustor wall 100, at aft ends of the combustor walls 98 and 100. With this arrangement, the combustor walls 58, 98 and 100 collectively form peripheral boundaries of the combustion chamber 54 within the combustor 52.

The turbine nozzle 86 is disposed within the turbine section 39, for example, at an intersection between the combustor section 38 and the turbine section 39. This turbine nozzle 86 may be configured to condition the combustion products leaving the combustor section 38 and its combustion chamber 54 and entering the turbine section 39. The turbine nozzle 86 of FIG. 1, for example, includes one or more turbine guide vanes 106 configured to impart swirl to the combustion products. These turbine guide vanes 106 are arranged circumferentially about the axial centerline 28 in an annular array; e.g., a turbine nozzle vane array. Each of the turbine guide vanes 106 extends radially across the core flowpath 34 between and is connected to the inner platform 104 of the turbine nozzle 86 and the outer platform 102 of the turbine nozzle 86.

The turbine case 88 houses at least a portion of the turbine section 39 and its turbine rotor 46. The turbine case 88, for example, extends circumferentially about (e.g., circumscribes) and axially overlaps at least a (e.g., an aft, downstream) portion of the turbine rotor 46. The turbine case 88 may thereby form an outer peripheral boundary of the core flowpath 34 within at least (e.g., an aft, downstream) portion of the compressor section 37.

The exhaust case 90 extends axially between and to one or more of the engine cases 84 and 88 and the engine exhaust 32. The exhaust case 90 may also be connected to the diffuser case 84 and/or the turbine case 88 at aft ends thereof. The exhaust case 90 extends circumferentially about (e.g., completely around) the axial centerline 28. The exhaust case 90 may thereby form an outer peripheral boundary of the core flowpath 34 within the exhaust section 40 to the engine exhaust 32.

An aft, downstream end of the upstream stationary structure 64 is mated with and connected to a forward, upstream end of the downstream stationary structure 66. The upstream stationary structure 64 of FIG. 1, for example, is attached to the downstream stationary structure 66 by at least one mechanical joint; e.g., a bolted flange connection. However, in other embodiments, the upstream stationary structure 64 may also or alternatively be attached to the downstream stationary structure 66 by at least one bond joint; e.g., a braze connection, a welded connection, etc.

Figure 2:
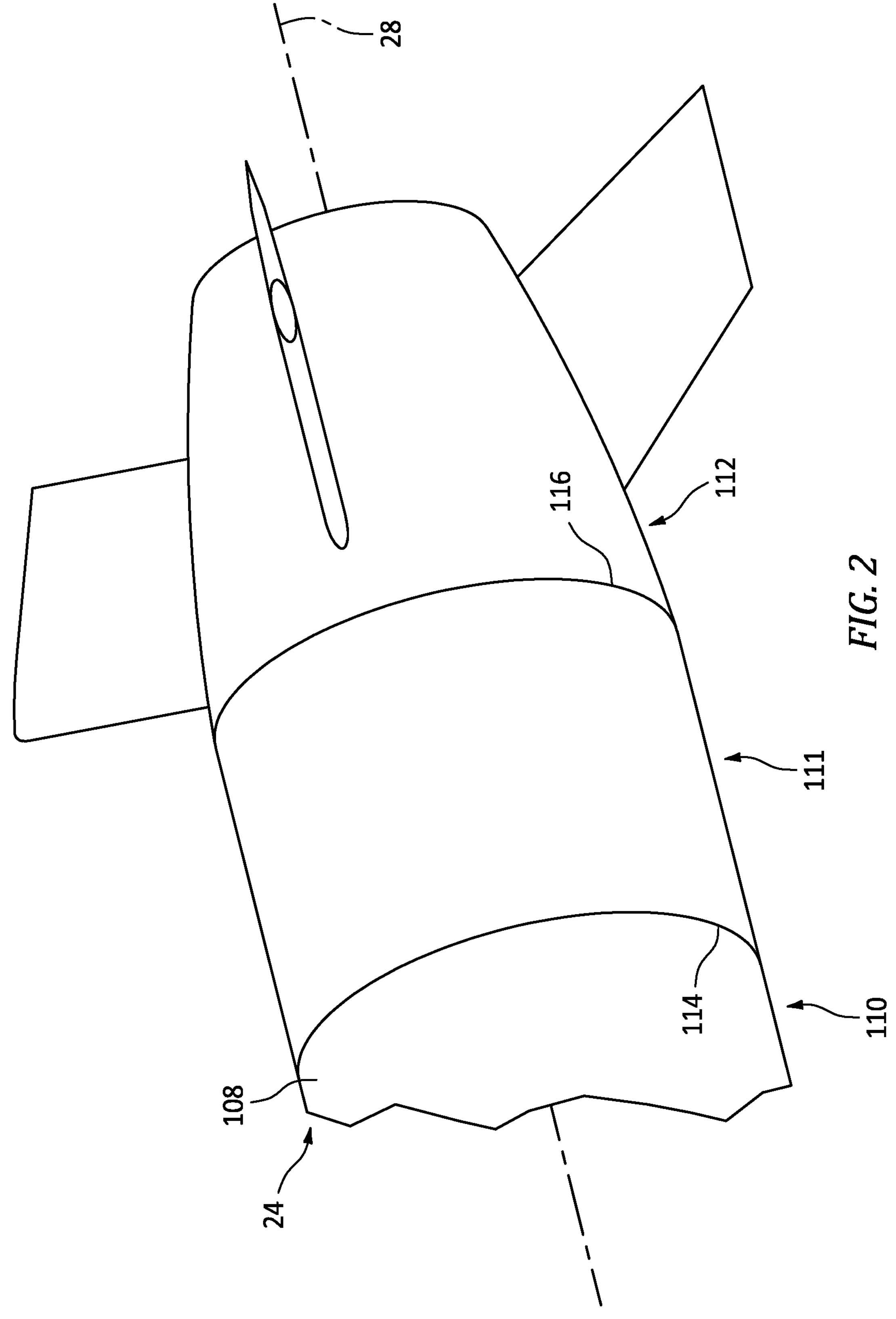
FIG. 2 is a perspective illustration of a portion of a vehicle body.

The vehicle body 24 is configured to (e.g., completely) house the gas turbine engine 22. The vehicle body 24 may also be configured to form an outer (e.g., exterior) aerodynamic surface 108 for the vehicle; see also FIG. 2. The vehicle body 24, for example, may be configured as a nacelle for the gas turbine engine 22. The vehicle body 24 may also or alternatively be configured as a fuselage and/or another airframe component for the vehicle.

The vehicle body 24 of FIG. 1 includes a plurality of sections 110-112; e.g., generally tubular exterior vehicle walls. The first body section 110 may be configured as a forward, upstream section of the vehicle body 24. The second body section 111 may be configured as an intermediate section of the vehicle body 24. The third body section 112 may be configured as an aft, downstream section of the vehicle body 24.

Each of the body sections 110, 111, 112 extends circumferentially about (e.g., completely around) the axial centerline 28 providing that respective body section 110, 111, 112 with a tubular geometry. The first body section 110 and the second body section 111 of FIG. 1 may each extends circumferentially about (e.g., circumscribe) and axially along (e.g., overlap) the gas turbine engine 22. The second body section 111, in particular, extends axially along the axial centerline 28 between a forward, upstream end 114 of the second body section 111 and an aft, downstream end 116 of the second body section 111. The upstream end 114 of the second body section 111 may be axially aligned with (or disposed axially near) an interface between the stationary structures 64 and 66. The downstream end 116 of the second body section 111 may be axially aligned with (or disposed axially near) the engine exhaust 32. The first body section 110 may be attached to the second body section 111 at the upstream end 114 of the second body section 111 through a mechanical joint; e.g., a bolted flange coupling. The third body section 112 may be attached to the second body section 111 at the downstream end 116 of the second body section 111 through a mechanical joint; e.g., a bolted flange coupling. Of course, in other embodiments, the second body section 111 may also or alternatively be attached to the first body section 110 and/or the third body section 112 through a bond connection; e.g., a brazed connection, a welded connection, etc.

The support structure 26 is configured to support and locate the gas turbine engine 22 within the vehicle body 24. The support structure 26 of FIG. 1, for example, extends radially between and is connected to (1) the static engine structure 42 and its downstream stationary structure 66 and (2) the vehicle body 24 and its second body section 111. The support structure 26 thereby (e.g., directly) connects the static engine structure 42 and its downstream stationary structure 66 to the vehicle body 24 and its second body section 111. The downstream stationary structure 66 may connect the upstream stationary structure 64 to the support structure 26. The support structure 26 may thereby also (e.g., indirectly) connect the upstream stationary structure 64 to the vehicle body 24 and its second body section 111.

The support structure 26 of FIG. 1 is formed integral with the downstream stationary structure 66 and the second body section 111 as part of the monolithic body 70; e.g., the monolithic vehicle component. The support structure 26, the downstream stationary structure 66 and the second body section 111, for example, may be additively manufactured, cast, machined and/or otherwise formed together as a common integral, unitary body. Such a configuration facilitates integrating the gas turbine engine 22 into a (e.g., monocoque) power module. The vehicle may thereby be readily provided with different power module configurations (e.g., thrust ratings, mission ranges, etc.) based on, for example, specific mission requirements, etc. Power modules may also be readily swapped out for maintenance, repair, etc. when needed. Furthermore, providing the monolithic body 70 may reduce complexity and/or a part count for the vehicle, which may in turn reduce manufacturing and/or assembly costs of the vehicle.

Figure 3:
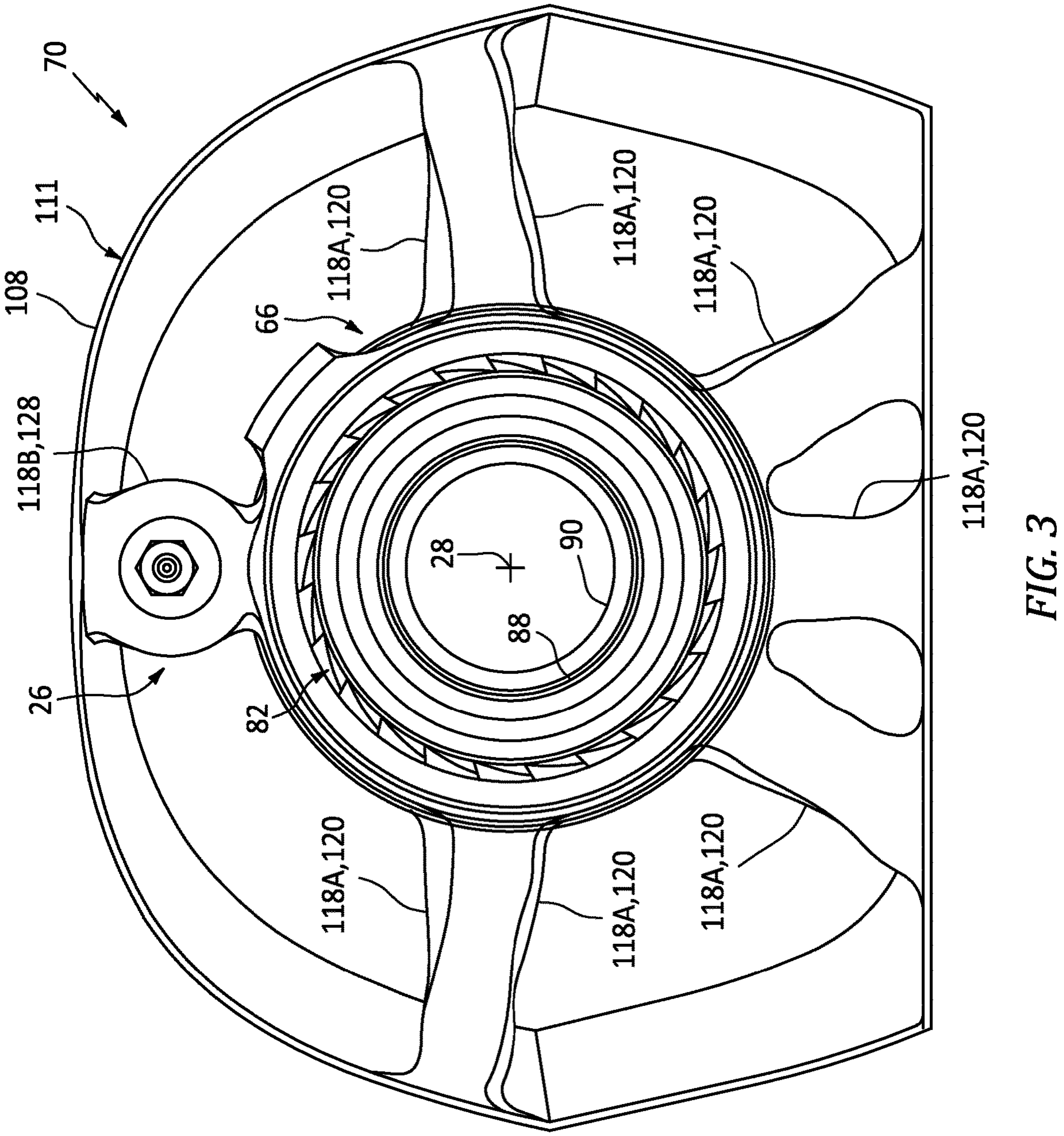
FIG. 3 is an end view illustration of a monolithic component of the vehicle.
Figure 4:
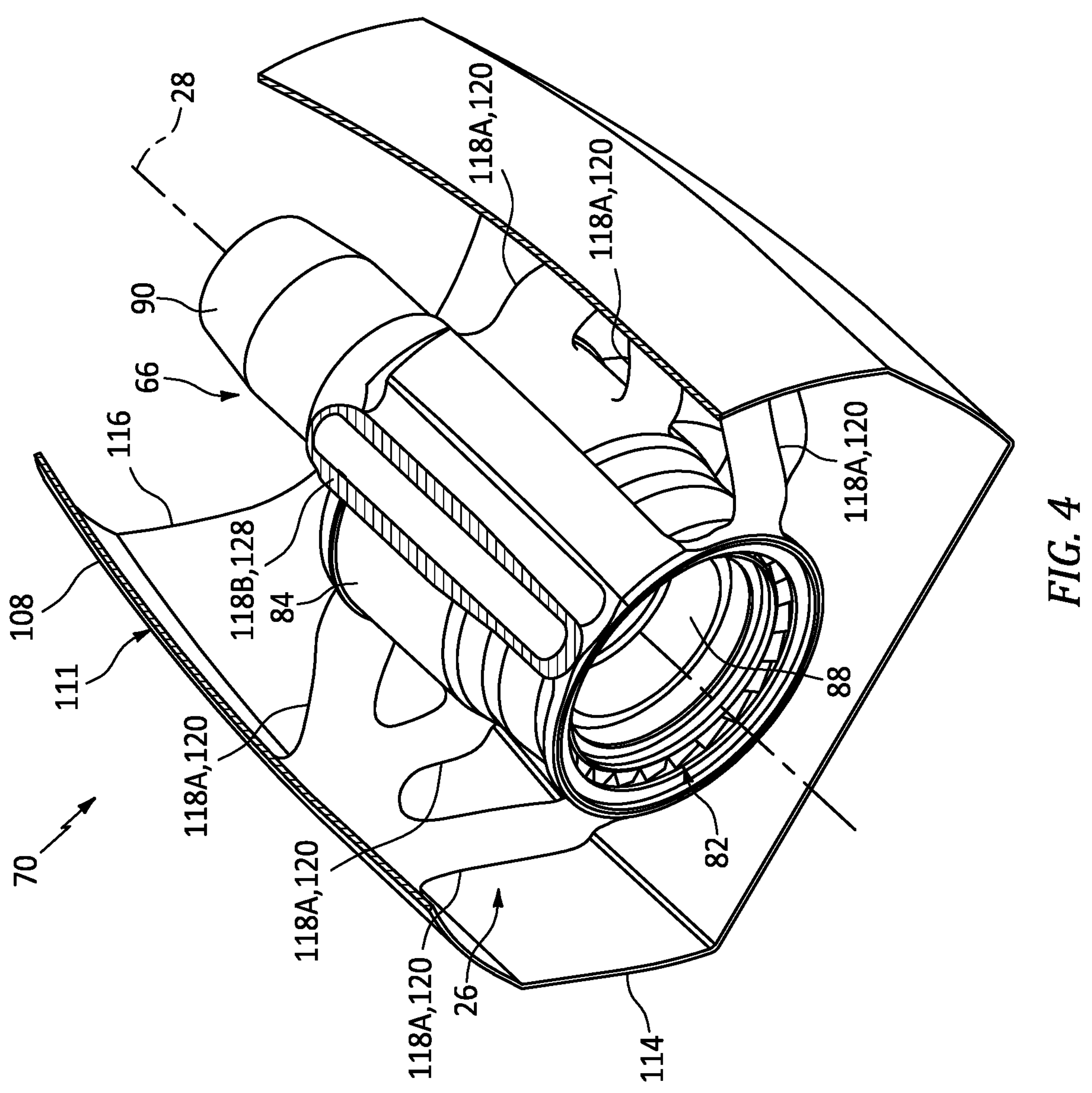
FIG. 4 is a perspective cutaway illustration of the monolithic vehicle component.

In some embodiments, referring to FIGS. 3 and 4, the support structure 26 may include one or more support members 118A and 118B (generally referred to as 118). Referring to FIG. 3, at least some (or all) of the support members 118 may be distributed circumferentially about the gas turbine engine 22 and its downstream stationary structure 66; e.g., in at least one circumferentially extending array (or multiple arrays). The support members 118 may thereby support the gas turbine engine 22 and its downstream stationary structure 66 at multiple locations in a reference plane, for example, perpendicular to the axial centerline 28. Referring to FIG. 4, at least some (or all) of the support members 118 may also or alternatively be distributed axially along the gas turbine engine 22 and its downstream stationary structure 66; e.g., in at least one axially extending array (or multiple arrays). The support members 118 may thereby support the gas turbine engine 22 and its downstream stationary structure 66 at multiple locations in a reference plane, for example, parallel to and/or containing the axial centerline 28. Furthermore, with the support member arrangement of FIGS. 3 and 4, the support structure 26 and its support members 118 may (e.g., directly) support a central region of and/or center of mass of the gas turbine engine 22.

In some embodiments, one or more of the support members 118A may each be configured as or otherwise includes a strut 120. Examples of the strut 120 include, but are not limited to, a stanchion, a ligament, a post, etc. Each strut 120 extends radially between the downstream stationary structure 66 and the second body section 111. Each strut 120 is connected (e.g., directly or indirectly) to the downstream stationary structure 66 and the second body section 111. For example, each strut 120 may be individually connected to the downstream stationary structure 66. A grouping of the struts 120, however, may be collectively connected to the second body section 111 through a common (e.g., the same) support member base; e.g., a trunk. Of course, in other embodiments, the struts 120 may be individually (e.g., discretely, separately, etc.) connected to the second body section 111 and/or the grouping of the struts 120 may be collectively connected to the downstream stationary structure 66 through a common (e.g., the same) support member base.

Figure 7:
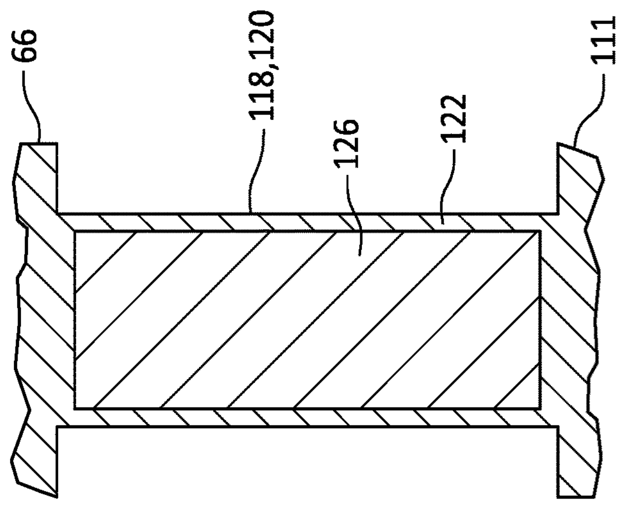
FIG. 7 is a schematic sectional illustration of a portion of the monolithic vehicle component with a filled support member.
Figure 7:
Figure 6:
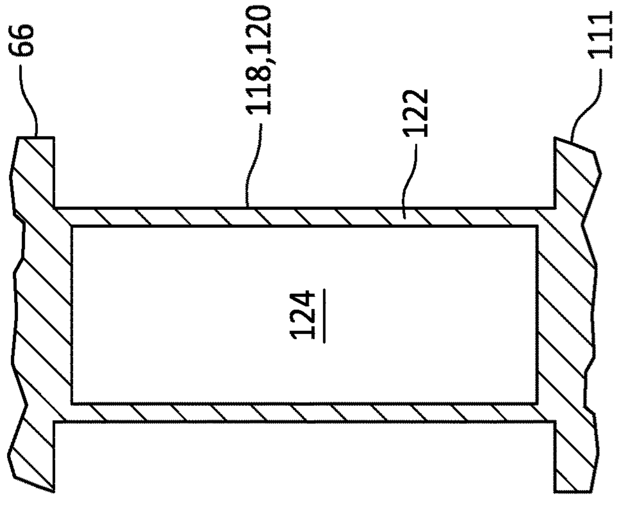
FIG. 6 is a schematic sectional illustration of a portion of the monolithic vehicle component with a hollow support member.
Figure 5:
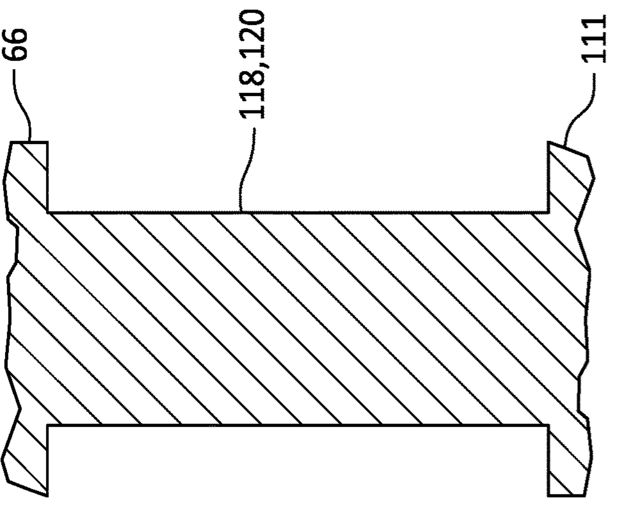
FIG. 5 is a schematic sectional illustration of a portion of the monolithic vehicle component with a solid support member.
Figure 8B:
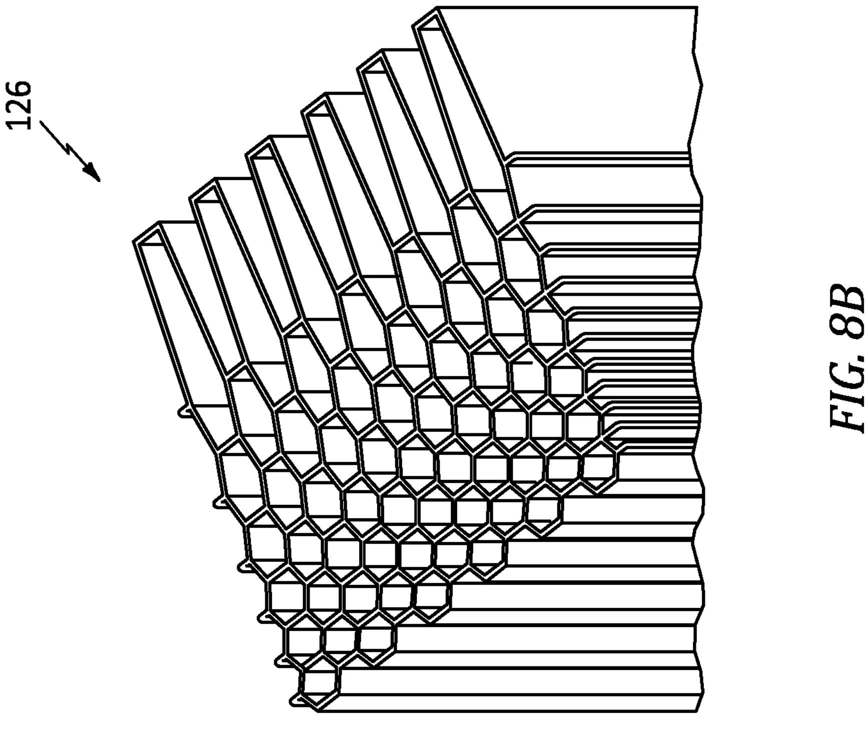
FIGS. 8A and 8B are perspective illustrations of exemplary fillers for filling the filled support member.
Figure 8A:
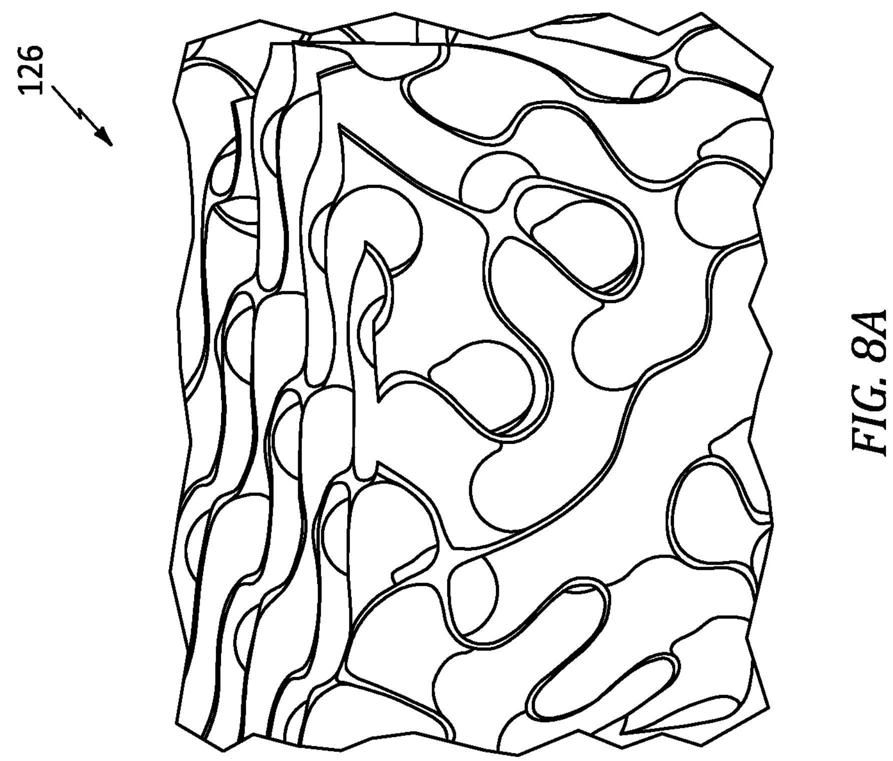

In some embodiments, referring to FIG. 5, one or more of the support members 118 may each be configured with a solid body; e.g., without any internal voids, passages, etc. In other embodiments, referring to FIG. 6, one or more of the support members 118 may each include an outer (e.g., exterior) wall 122 which forms at least one internal volume 124 (e.g., a passage, a cavity, etc.) within the respective support member 118. This internal volume 124 may be empty. Alternatively, referring to FIG. 7, the internal volume 124 may be partially or completely filled with a filler 126 (e.g., a porous structure) such as, but not limited to, a lattice structure (e.g., see FIGS. 8A and 8B) or foam.

In some embodiments, referring to FIG. 1, at least one of the support members 118 (e.g., 118B) may be configured with or at least partially form a fluid reservoir 128 for the vehicle; e.g., for the gas turbine engine 22. The support member 118B of FIG. 1, for example, is configured with an integral, internal fuel reservoir for the gas turbine engine 22. This fuel reservoir is formed by an internal volume 130 (e.g., open cavity) within the support member 118B. The support member 118B of FIG. 1 may thereby perform multiple functions including locating the gas turbine engine 22, supporting the gas turbine engine 22 and storing fuel (or another fluid or substance) for use in gas turbine engine operation; e.g., during gas turbine engine start up.

Figure 9:
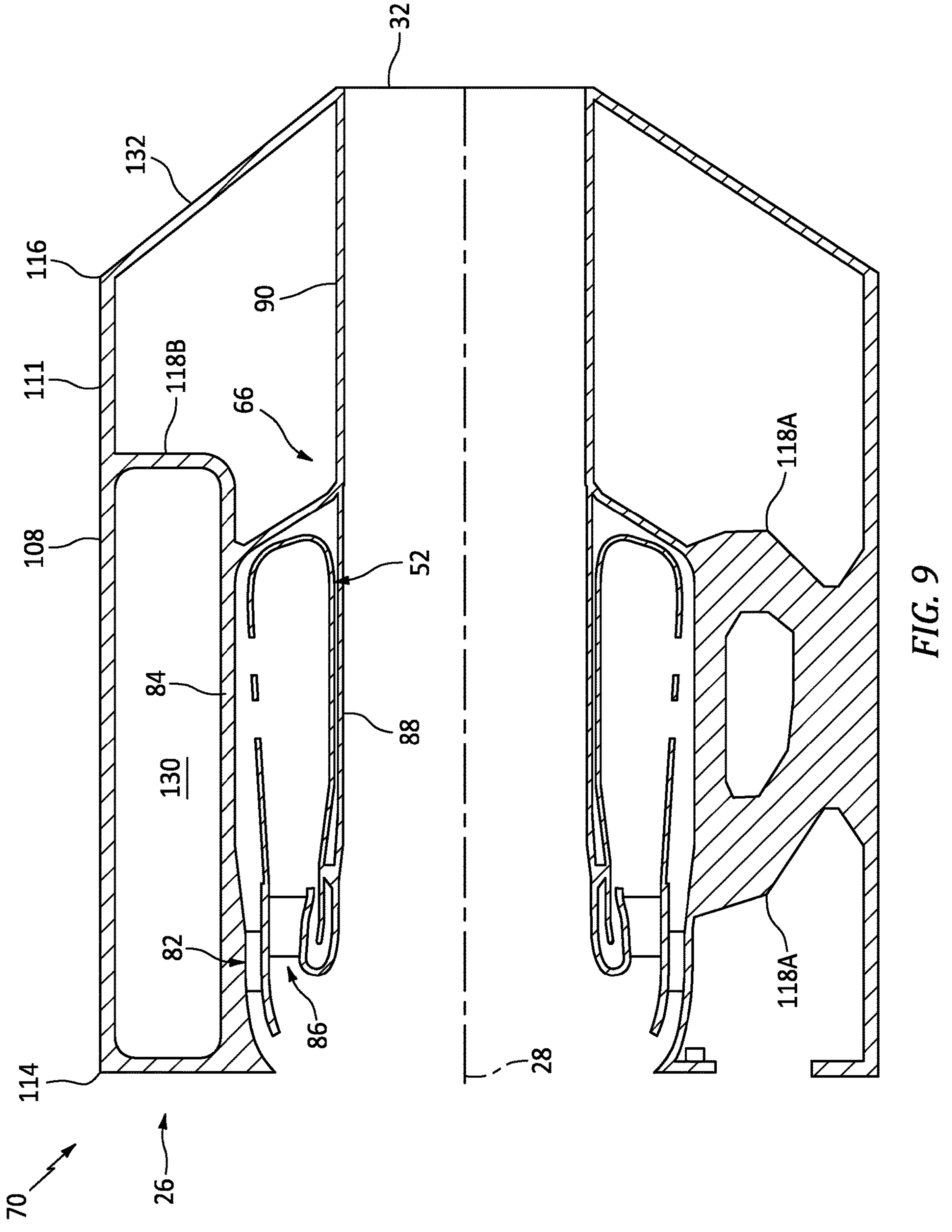
FIG. 9 is a side sectional illustration of the monolithic vehicle component with a closed aft end.
Figure 10:
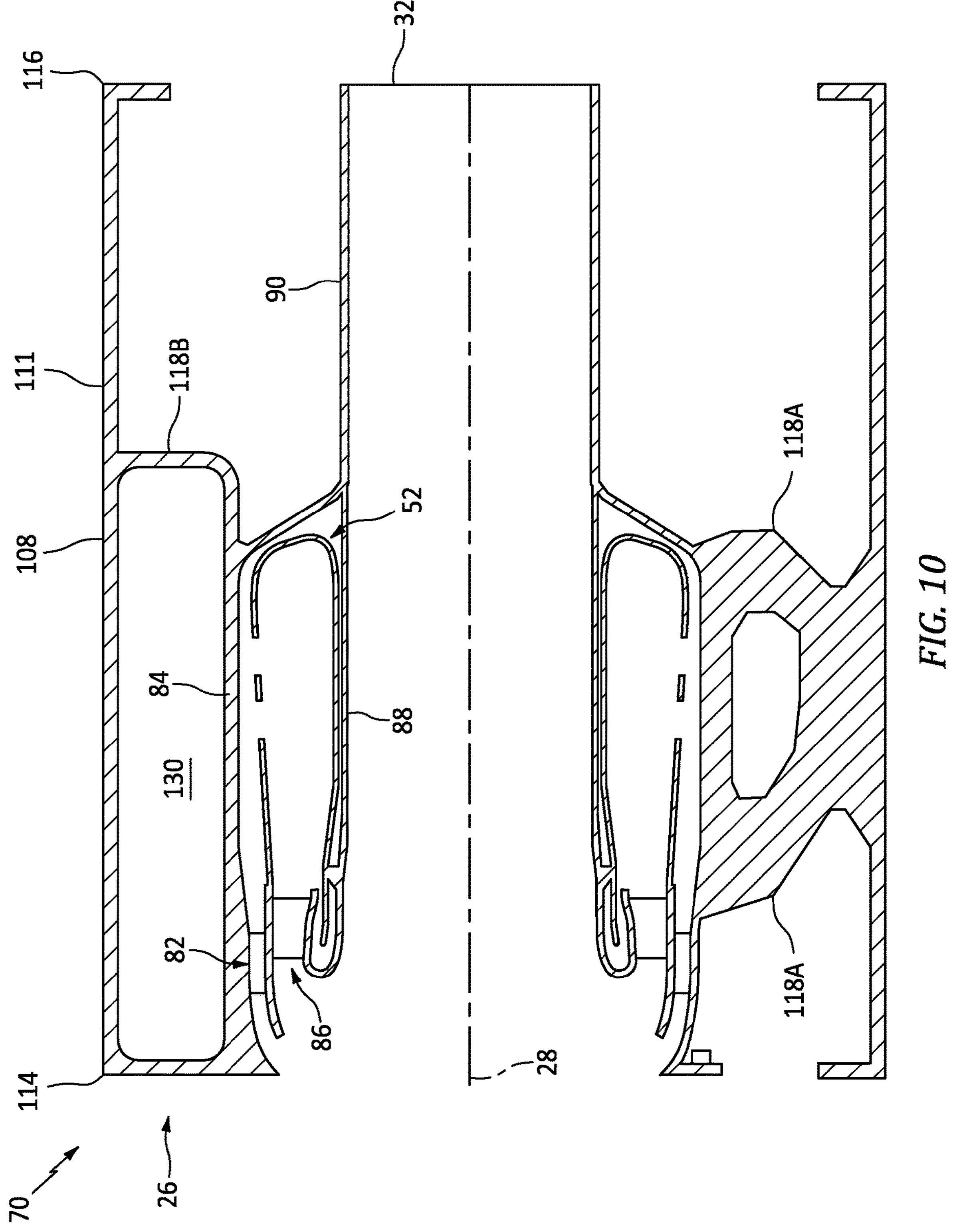
FIG. 10 is a side sectional illustration of the monolithic vehicle component with an open aft end.

In some embodiments, referring to FIG. 9, the monolithic (e.g., power module) body 70 may be configured with a closed aft end. The monolithic body 70 of FIG. 9, for example, may also include an (e.g., annular) endwall 132 that extends radially between and is connected to the second body section 111 and the exhaust case 90 at, for example, aft, downstream ends thereof. In other embodiments however, referring to FIG. 10, the monolithic body 70 may be configured with an open aft end. The monolithic body 70, for example, may be configured without the endwall 132.

Each monolithic body 68, 70 may be additively manufactured using an additive manufacturing apparatus. Examples of the additive manufacturing apparatus include, but are not limited to, an energy (e.g., laser or electron) beam powder bed fusion (PBF) apparatus, a stereolithography (SLA) apparatus, a direct selective laser sintering (DSLS) apparatus, an electron beam sintering (EBS) apparatus, an electron beam melting (EBM) apparatus, a laser engineered net shaping (LENS) apparatus, a laser net shape manufacturing (LNSM) apparatus, a direct metal deposition (DMD) apparatus, a direct metal laser sintering (DMLS) apparatus or any other type of additive manufacturing apparatus. However, while the monolithic body 68, 70 may be formed using the additive manufacturing apparatus, the monolithic body 68, 70 may also or alternatively be formed using one or more other manufacturing processes.

The gas turbine engine 22 is described above as a single spool, radial-flow turbojet gas turbine engine for ease of description. The present disclosure, however, is not limited to such an exemplary gas turbine engine. The gas turbine engine 22, for example, may alternatively be configured as an axial flow gas turbine engine. The gas turbine engine 22 may be configured as a direct drive gas turbine engine. The gas turbine engine 22 may alternatively include a gear train that connects one or more rotors together such that the rotors rotate at different speeds. The gas turbine engine 22 may be configured with a single spool (e.g., see FIG. 1), two spools, or with more than two spools. The gas turbine engine 22 may be configured as a turbofan engine, a turbojet engine, a turboprop engine, a turboshaft engine, a propfan engine, a pusher fan engine or any other type of turbine engine. In addition, while the gas turbine engine 22 is described above with an exemplary reverse flow annular combustor, the gas turbine engine 22 may also or alternatively include any other type/configuration of annular, tubular (e.g., CAN), axial flow and/or reverse flow combustor. The present disclosure therefore is not limited to any particular types or configurations of gas turbine engines.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. An assembly for an aerial vehicle, comprising:

a vehicle body comprising a body section;

a gas turbine engine comprising a stationary structure and a rotating structure, the gas turbine engine housed within the vehicle body, the stationary structure comprising a combustor within the gas turbine engine, the rotating structure comprising a turbine rotor, and the stationary structure housing the turbine rotor within the gas turbine engine;

a support structure extending between and connected to the body section and the stationary structure, the support structure supporting the gas turbine engine within the vehicle body, the support structure including a plurality of support members radially between the body section and the stationary structure, a first of the plurality of support members comprising a fuel reservoir for the gas turbine engine, the fuel reservoir axially overlapping and radially outboard of the combustor and the rotating structure, and the fuel reservoir configured to store a combustible fuel; and the body section spaced radially out from, extending circumferentially about and extending axially along the gas turbine engine, and the body section, the stationary structure and the support structure included in a monolithic body, the body section partially forming an outer aerodynamic surface of the aerial vehicle.

2. The assembly of claim 1, wherein the vehicle body comprises at least one of a fuselage or a nacelle.

3. The assembly of claim 1, wherein the stationary structure comprises a vane array within the gas turbine engine.

4. The assembly of claim 1, wherein the stationary structure comprises at least one of a diffuser case;

a turbine case; or an exhaust case.

5. The assembly of claim 1, wherein the plurality of support members are distributed circumferentially about the gas turbine engine.

6. The assembly of claim 1, wherein the plurality of support members are distributed axially along the gas turbine engine.

7. The assembly of claim 1, wherein a second of the plurality of support members comprises a strut and is axially aligned with the fuel reservoir.

8. The assembly of claim 1, wherein the stationary structure comprises a downstream stationary structure; and the gas turbine engine further comprises an upstream stationary structure mechanically attached to the downstream stationary structure, and the upstream stationary structure forms an inlet section of the gas turbine engine.

9. The assembly of claim 1, wherein the stationary structure and the support structure are disposed within an interior of the vehicle body.

10. An assembly for an aerial vehicle, comprising:

a vehicle body;

a gas turbine engine comprising a stationary structure, the gas turbine engine housed within the vehicle body; and a plurality of support members extending between and connected to the vehicle body and the stationary structure, the plurality of support members locating and supporting the gas turbine engine within the vehicle body, the plurality of support members comprising a first support member and a second support member, the first support member comprising a porous structure within an internal volume of the first support member, the second support member comprising a fluid fuel reservoir, the first support member and the second support member disposed within the vehicle body, and the fluid fuel reservoir extending within the second support member radially between the vehicle body and the gas turbine engine;

at least the stationary structure and the plurality of support members formed together in a monolithic body.

11. The assembly of claim 10, wherein the vehicle body comprises a tubular body section; and at least the tubular body section, the stationary structure and the plurality of support members are formed together in the monolithic body.

12. The assembly of claim 10, wherein the porous structure comprises a lattice structure.

13. The assembly of claim 10, wherein the porous structure comprises foam.

14. An assembly for an aerial vehicle, comprising:

a vehicle body;

a gas turbine engine including a stationary structure and a rotating structure at least partially housed within the stationary structure, the rotating structure comprising a compressor rotor housed within the stationary structure, the gas turbine engine housed within the vehicle body, the stationary structure comprising a combustor within the gas turbine engine, and the rotating structure configured to rotate about an axial centerline of the gas turbine engine; and a support structure extending between and connected to the vehicle body and the stationary structure, the support structure supporting the gas turbine engine within the vehicle body, and the support structure comprising an integral fluid fuel reservoir radially between the gas turbine engine and the vehicle body, wherein an axial length of the integral fluid fuel reservoir along the axial centerline is greater than an axial length of the combustor along the axial centerline, wherein the integral fluid fuel reservoir is radially outboard of and axially overlaps the rotating structure, and the integral fluid fuel reservoir includes an internal volume storing a combustible fuel source.

15. The assembly of claim 14, wherein the rotating structure further comprises a turbine rotor housed within the stationary structure.

16. The assembly of claim 14, wherein the integral fluid fuel reservoir is radially outboard of and axially overlaps the combustor.

17. The assembly of claim 14, wherein the support structure is arranged within the vehicle body.

* * * * *